United States Patent
Lee et al.

(10) Patent No.: US 9,808,874 B2
(45) Date of Patent: Nov. 7, 2017

(54) FLUX COMPOSITION AND TECHNIQUES FOR USE THEREOF

(75) Inventors: Kang-Wook Lee, Yorktown Heights, NY (US); Jae-Woong Nah, New York, NY (US); Nathalie Normand, Bromont (CA); Valerie Oberson, St-Alphonse de Granby (CA)

(73) Assignee: International Business Machines Corporation, Armonk, NY (US)

( * ) Notice: Subject to any disclaimer, the term of this patent is extended or adjusted under 35 U.S.C. 154(b) by 102 days.

(21) Appl. No.: 13/613,000

(22) Filed: Sep. 13, 2012

(65) Prior Publication Data

US 2013/0001279 A1 Jan. 3, 2013

Related U.S. Application Data

(63) Continuation of application No. 13/034,932, filed on Feb. 25, 2011.

(51) Int. Cl.
*B23K 1/00* (2006.01)
*B23K 35/36* (2006.01)
*B23K 35/362* (2006.01)

(52) U.S. Cl.
CPC ........ *B23K 1/0016* (2013.01); *B23K 35/3601* (2013.01); *B23K 35/362* (2013.01)

(58) Field of Classification Search
CPC B23K 35/362; B23K 35/3613; B23K 1/0016; B23K 35/3601
USPC .................................................... 148/23, 528
See application file for complete search history.

(56) References Cited

U.S. PATENT DOCUMENTS

| | | | |
|---|---|---|---|
| 4,168,996 A | 9/1979 | Zado | |
| 4,441,938 A * | 4/1984 | Poliak | B23K 35/3613 148/23 |
| 4,478,650 A * | 10/1984 | Zado | B23K 35/3615 148/23 |
| 4,762,573 A | 8/1988 | Biverstedt | |
| 5,091,242 A | 2/1992 | Chung | |
| 5,177,134 A | 1/1993 | Mullen, III et al. | |
| 5,297,721 A | 3/1994 | Schneider et al. | |
| 5,411,602 A | 5/1995 | Hayes | |
| 5,615,827 A | 4/1997 | Arldt et al. | |
| 5,830,389 A | 11/1998 | Capote et al. | |
| 6,524,398 B2 | 2/2003 | Arora et al. | |
| 6,550,667 B2 | 4/2003 | Bernier et al. | |
| 6,585,963 B1 | 7/2003 | Quan et al. | |
| 7,017,795 B2 | 3/2006 | Liu et al. | |

(Continued)

FOREIGN PATENT DOCUMENTS

| | | | | |
|---|---|---|---|---|
| DE | 4415527 A1 | 11/1995 | | |
| DE | 4416627 A1 * | 11/1995 | | F01L 1/053 |
| WO | WO 9821264 A1 * | 5/1998 | | |

OTHER PUBLICATIONS

Cookson Electronics Alpha. http://alpha.cooksonelectronics.com/main.asp, pp. 1-2.

(Continued)

*Primary Examiner* — Weiping Zhu
(74) *Attorney, Agent, or Firm* — Ryan, Mason & Lewis, LLP

(57) ABSTRACT

The present invention is directed to a soldering method for joining objects is also provided, comprising the steps of applying a flux composition to at least a portion of one or more of the objects, and joining the objects.

8 Claims, 4 Drawing Sheets

(56) References Cited

U.S. PATENT DOCUMENTS

| | | | |
|---|---|---|---|
| 7,022,266 | B1 | 4/2006 | Craig |
| 7,241,348 | B2 | 7/2007 | Wada et al. |
| 7,271,100 | B2 | 9/2007 | Lee et al. |
| 7,575,150 | B2 | 8/2009 | Saito et al. |
| 7,740,713 | B2 | 6/2010 | Duchesne et al. |
| 7,780,801 | B2 * | 8/2010 | Duchesne ............ B23K 35/362 148/23 |
| 2003/0125505 | A1 | 7/2003 | Weaver et al. |
| 2004/0042993 | A1 | 3/2004 | Gabin |
| 2004/0084510 | A1 | 5/2004 | Wetz et al. |
| 2004/0129344 | A1 | 7/2004 | Arita et al. |
| 2005/0165203 | A1 | 7/2005 | Kohn et al. |
| 2006/0147683 | A1 | 7/2006 | Ikeda et al. |
| 2007/0042010 | A1 * | 2/2007 | Southall .................. A61K 8/41 424/401 |
| 2007/0122436 | A1 * | 5/2007 | Koltzenburg et al. ........ 424/405 |
| 2008/0124568 | A1 * | 5/2008 | Duchesne et al. ............ 428/615 |
| 2010/0139952 | A1 * | 6/2010 | Arora et al. .................. 174/250 |

OTHER PUBLICATIONS

Ning-Cheng Lee, Fluxing for Flip Chip, http://www.flipchips.com/tutotial18.html, Apr. 2002, pp. 1-3.

Injection Molded Soldering, http://www.research.ibm.com/ims/, pp. 1-3.

George A. Riley, Introduction to Flip Chip: What, Why, How, http://www.flipchips.com/tutorial01.html, Oct. 2000, pp. 1-5.

Solder Bump Flip Chip, http://www.flipchips.com/tutorial02a.html, Nov. 2000, pp. 1-5.

Ken Gilleo, A Brief History of Flipped Chips, http://www.flipchips.com/tutorial06.html, Mar. 2001, pp. 1-9.

Deborah S. Patterson, The Back-End Process: Step 7—Solder Bumping Step by Step, http://www.electroiq.com/index/display/Packaging__Article_Tools_Template/_printArticle/articles/advanced-packaging/volume-10/issue-7/features/step-by-step/the-back-end-process-step-7-solder-bumping-step-by-step.html, pp. 1-9.

Gerard Minogue, Packaging, Handling, and Storage of Solder Spheres, http://www.flipchips.com/tutorial16.html, Feb. 2002, pp. 1-4.

Manufacturing conditions allowing "drop-in" lead free solder, http://www.flipchips.com/tutorial48.html, Jan. 2005, pp. 1-2.

George Riley, The Promise of C4NP, http://www.flipchips.com/tutorial55.html, Sep. 2005, pp. 1-3.

* cited by examiner

FLUX COMPOSITION AND TECHNIQUES FOR USE THEREOF

CROSS-REFERENCE TO RELATED APPLICATIONS

This application is a continuation of U.S. patent application Ser. No. 13/034,932, filed Feb. 25, 2011, incorporated by reference herein.

FIELD OF THE INVENTION

Embodiments of the invention generally relate to soldering techniques and, more particularly, to flux compositions and techniques for use thereof.

BACKGROUND OF THE INVENTION

Fluxes play an important role in solder-joining electronic components, such as semiconductor devices, onto printed circuit cards or printed circuit boards (PCBs). Flux is used in a process of flip-chip joining to a substrate that has ball grid arrays (BGA) or land grid arrays (LGA). In a typical process, by way of example, flux is applied onto a substrate followed by placing a chip onto the flux-applied substrate. Then, the chip-substrate module goes through a reflow process at a high temperature so as to make solder connections. The subsequently formed flux residue is cleaned (for example, with water) followed by drying the module. An underfill material is introduced into the gap between the chip and the substrate to maintain the integrity of the flip-chip package.

As the density of Controlled Collapse Chip Connection (C4) arrays and the chip size increase, the joining process sometimes produces non-wets at a corner of the large chip due to the smaller C4 size and the larger warpage of a substrate. It also becomes more difficult to clean flux residue, formed during flip-chip joining, out of the narrow chip-substrate gap of the large chip package.

Non-wets which make electrical open should be avoided, and flux residue often causes delamination between underfill and chip or between underfill and substrate, resulting in failure of flip-chip packages. As the size of solder balls in a chip decrease, slight movement of an aligned chip-laminate module during a reflow process can cause non-wets, because a typical high-throughput reflow tool tends to vibrate. Such non-wets can increase in the case of multi-chip modules.

Chemical components of a flux or its impurities can decompose or vaporize during reflow to give out vapors, which can cause chips to move out of position. Highly tacky fluxes can, however, prevent movement of chips even though vapors are coming out or a reflow furnace vibrates. Also, chemical components of the flux should have a boiling point that is higher than a typical reflow temperature in order to avoid movement of chips due to boiling. Solvent molecules of the flux, if they do not evaporate upon reflow due to their high boiling points, should be large enough so as not to diffuse into a substrate outer layer such as solder mask, which is relatively porous because it is a photoresist with silica fillers.

However, after joining, left-over flux and by-products of the reaction between flux and solders need to be cleaned, preferably with a low cost and environment friendly method because cleaning with organic solvent is not only harmful to human beings and the environment but also expensive, in regards to both the material itself and the waste treatment process. Therefore, it would be desirable to develop a flux that has sufficient tackiness and a sufficiently high boiling point, while the flux residue can be cleaned with water.

Many existing fluxes in the industry, however, provide an inadequate joining capability in case of lead-free solders, give non-wets at the corner of a chip, leave considerable flux residue onto chip, C4 and substrate surfaces after cleaning, diffuse into the substrate outer layer, and/or cause chip movement during reflow.

By way of example, existing fluxes include disadvantageous aspects such as being small enough to diffuse into a solder mask layer at a reflow temperature, resulting in a failure of the semiconductor package, not providing enough tackiness or viscosity, as well as often leaving residue after reflow that cannot be cleaned with water.

Accordingly, there is a need for soldering flux compositions that can effectively manufacture the modern and high-performance semiconductor packages used for computers, communication devices, home electronics, game consoles, audio/video equipments, automobiles, etc.

SUMMARY OF THE INVENTION

Principles and embodiments of the invention provide a flux composition and techniques for use thereof. In one aspect of the invention, a flux composition is provided. The flux composition comprises an activator, a medium-viscosity solvent being a polymer, and a high-viscosity solvent being a copolymer containing a plurality of first monomers and a plurality of second monomers.

In another aspect of the invention, a soldering method for joining objects is provided comprising the steps of applying a flux composition to at least a portion of one or more of the objects, the flux composition comprising an activator, a medium-viscosity solvent being a polymer, and a high-viscosity solvent being a copolymer containing a plurality of first monomers and a plurality of second monomers, and joining the objects.

In another aspect of the invention, a flux composition is provided. The flux composition comprises an activator, and a high-viscosity solvent, wherein the high-viscosity solvent comprises a copolymer containing a plurality of first monomers and a plurality of second monomers. In yet another aspect of the invention, a flux composition is provided. The flux composition comprises one or more diacid activators, and a medium-viscosity solvent, wherein the medium-viscosity solvent comprises a polymer.

Further, in yet another aspect of the invention, a flux composition is provided. The flux composition comprises an activator in a liquid state, and a medium-viscosity solvent, wherein the medium-viscosity solvent comprises a polymer.

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
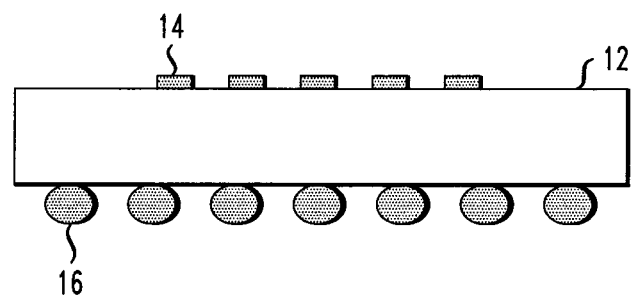
FIG. 1 is a diagram illustrating a substrate, according to an embodiment of the present invention.

A flux composition suitable for use in solder-joining, for example, electrical components, is disclosed herein. One or more embodiments of the invention include a water-soluble highly-tacky flux composition. As detailed herein, a flux of one or more embodiments of the invention can include properties such as solder joining capability, high tackiness, water cleaning capability, and no boiling at reflow. Tackiness is related to and indicated by viscosity; namely, the more viscous a liquid, the tackier the liquid. Because viscosity of a solvent is to be appreciated by one skilled in the art, viscosity is used accordingly herein.

The composition of a flux, as detailed herein, includes at least an activator and at least one solvent. Accordingly, such a flux composition can include a fluxing agent (also referred to herein as an activator) that includes multi-acids that contain two or more carboxylic acid groups. One or more embodiments of the invention include using multi-acids such as oxalic acid, malonic acid, succinic acid, glutaric acid, adipic acid, pimelic acid, suberic acid, diglycolic acid, diethylenetriamine pentaacetic acid, tartaric acid and poly (acrylic acid). In one or more embodiments of the invention, another component of such a flux includes a medium-viscosity solvent that is employed to control flux application and water cleaning. Yet another component, in one or more embodiments of the invention, can include a high-viscosity solvent to further enhance flux tackiness.

Additionally, in one or more embodiments of the invention, a small amount of water (approximately 1% by total weight) can be present since these solvents can absorb moisture from the air.

By way of example, in one or more embodiments of the invention, a medium-viscosity solvent can include glycerol ethoxylate and/or glycerol ethoxylate-propoxylate copolymers, while a high-viscosity solvent can include ethylene glycol-propylene glycol copolymers. Both glycerol ethoxylate and glycerol ethoxylate-propoxylate copolymers have three hydroxyl end groups, while ethylene glycol-propylene glycol copolymers have two hydroxyl end groups. These hydroxyl end groups can enhance solubility in water as well as viscosity and tackiness. The solvents also help dissolve activators to create a homogeneous solution referred to as flux. It should be appreciated by one skilled in the art that other known high-viscosity and tacky solvents, for example, can also be used. Flux, as detailed herein, is soluble in water to have the flux residue cleaned with water, and it remains a homogeneous solution from room temperature to a reflow temperature. Homopolymers such as poly(ethylene glycol) and poly(propylene glycol) are not adequate to be high-viscosity solvents because they are insoluble in water, they cannot dissolve activators in a solid state and/or their viscosities are too low.

As described herein, however, copolymers can be high-viscosity solvents for the fluxes in one or more embodiments of the invention. The first and second monomers of such copolymers can be in a random or block sequence to form random copolymer or block copolymer. Additionally, one or more embodiments of the invention can also include highly viscous and tacky multi-acids, which can play a dual role of an activator and a tackiness enhancer. Such a multi-acid can include, for example, poly(ethylene glycol)-diacid.

In a certain type of flip-chip package, a highly tacky and viscous flux is not required while an effective activator is helpful in making the intended solder connections. Thus, one or more embodiments of the invention include a flux composition that includes one or more activators from the selected diacids (for example, glutaric acid, pimelic acid, tartaric acid, or mixtures thereof) and a medium-viscosity solvent, wherein the medium-viscosity solvent comprises a polymer with hydroxyl end groups.

As described herein, one or more embodiments of the invention can also include soldering techniques for joining objects. A flux composition, such as one detailed herein, is applied to at least a portion of one or more of the objects including chips and a substrate. As noted above and described further herein, the flux composition can include a fluxing agent (activator) comprising multi-acids, a medium viscosity and tacky agent (solvent 1) and a high viscosity and tacky agent (solvent 2). The objects can be joined at a high temperature. Additionally, flux residue formed during the joining process is removed with water so that no failure occurs in the microelectronic package product due to uncleaned flux residue that can include flux itself and flux-solder reaction byproducts. Flux tackiness is high enough to prevent slight movement of chips from a substrate during the reflow process so as to make the chip-substrate interconnections misaligned.

By way of example and not limitation, one or more embodiments of the invention can include the composition and use of fluxes such as the following examples. Flux A includes 5-12 weight % (of total composition weight) glutaric acid as an activator, 15-75 weight % glycerol ethoxylate as a medium viscosity solvent, and 20-80 weight % ethylene glycol-propylene glycol random-copolymer as a high viscosity solvent. Flux B includes 5-12 weight % glutaric acid as an activator, 15-75 weight % glycerol ethoxylate as a medium viscosity solvent, and 20-80 weight % ethylene glycol-propylene glycol-ethylene glycol block copolymer as a high viscosity solvent. Flux C includes 10-20 weight % poly(ethylene glycol)-diacids as an activator and a viscous liquid, 0-90 weight % glycerol ethoxylate, and 0-90 weight % ethylene glycol-propylene glycol random copolymer. Flux D includes 5-12 weight % glutaric acid, 5-15 weight % poly(ethylene glycol) diacids, 0-88 weight % glycerol ethoxylate, and 0-90 weight % ethylene glycol-propylene glycol random copolymer. Flux E includes 6-12 weight % glutaric acid as an activator, 15-70 weight % glycerol ethoxylate as a medium viscosity solvent, 20-75 weight % ethylene glycol-propylene glycol random-copolymer as a high viscosity solvent, and 4-10 weight % multi-amines. Flux F includes 10-20 weight % poly(ethylene glycol)-diacids as an activator and a viscous liquid, 0-86 weight % glycerol ethoxylate, 0-86 weight % ethylene glycol-propylene glycol random copolymer, and 4-10% multi-amines. Multi-amines, as detailed herein, should be soluble in water and can include, for example, tetrakis(4-hydroxypropyl)ethylenediamine (Quadrol®) and tetrakis(4-hydroxyethyl)ethylenediamine.

In one or more embodiments of the invention, the activators can include keto acid that can be selected from levulinic acid, acetyl butyric acid, 2-acetylbenzoic acid, 2-acetyloxybenzoic acid, 2-ketobutyric acid, acetoxyacetic acid, and pyruvic acid or mixtures thereof. Thus, Flux G can include 5-15% keto acid as an activator, 15-75 weight % glycerol ethoxylate as a medium viscosity solvent, and 20-80 weight % ethylene glycol-propylene glycol random-copolymer as a high viscosity solvent.

One or more embodiments of the invention also include a flux composition that includes one or more activators from the selected diacids (for example, glutaric acid, pimelic acid, tartaric acid, or mixtures thereof) and a medium-viscosity solvent, wherein the medium-viscosity solvent includes a polymer with hydroxyl end groups. Accordingly, for example, Flux H includes 6-12 weight % glutaric acid as an activator and 88-94 weight % glycerol ethoxylate as a medium-viscosity solvent. Flux I includes 6-12 weight % glutaric acid, 84-90 weight % glycerol ethoxylate as a medium-viscosity solvent, and 4-10 weight % multi-amines.

In one or more embodiments of the invention, molecular weights (MW) of high viscosity (tacky) solvents are in the range of 1,500-12,000. A viscous solvent with less than 1,500 MW or with greater than 12,000 does work properly because a low MW solvent does not provide enough tackiness while a high MW solvent cannot be effectively cleaned with water after reflow. The range of viscosity of the high viscosity (tacky) solvent or activator can include from 400 centi-Stokes (cSt) at 20 degrees Celsius to 35,000 cSt at 20 degrees Celsius. The MWs of medium viscosity (tacky) solvents are in the range of 500-5,000 while their viscosity can be in the range of 100-1,000 cSt. Additionally, in one or more embodiments of the invention, the boiling point of any flux component is greater than 250 degrees Celsius, a typical reflow temperature for lead-free solders.

Further, by way of example, tackiness of flux A is in the range of 250-2,000 gram force (gF), that of flux C in the range of 250-1,000 gF, and that of flux H in the range of 260-330 gF.

Also, by way of example, flux A can be prepared by dissolving glutaric acid activator in a solid state into a mixture of the medium and high viscosity solvents at 60° C. for 1-2 hours. Shaking the activator-solvent mixture can assist in the dissolution. In an example of Flux A, 10 weight % (of the total composition) glutaric acid was added to a mixture solvent of 45 weight % glycerol ethoxylate and 45 weight % ethylene glycol-propylene glycol random-copolymer. The entire mixture was heated to 60° C. for one hour and shaken. A homogeneous solution of the flux was prepared. The measured tackiness of this flux was in the range of 410-440 gF.

Additionally, for example, flux C can be prepared by mixing all three components, which are all liquids, at 60° C. for 1 hour. In an example of flux C, 20 weight % poly (ethylene glycol)-diacid, 40 weight % glycerol ethoxylate, and 40 weight % ethylene glycol-propylene glycol random copolymer were mixed at 60° C. for one hour to make a homogeneous solution of the flux. The measured tackiness of this flux was in the range of 280-330 gF.

Further, for example, flux H can be prepared by dissolving 8% by weight glutaric acid in a solid state into 92% by weight glycerol ethoxylate in a liquid state. The mixture can be heated to 60° C. for one hour and shaken. A homogeneous solution of the flux is then prepared, and the measured tackiness of this flux was in the range of 280-300 gF.

Fluxes such as described herein work in flip-chip joining of Pb-free solders. By way of example, Flux A can be spray-applied or brushed onto a laminate. Then, a large chip (20 millimeters (mm)×20 mm) with Pb-free solders such as, for example, Sn/Cu or Sn/Ag/Cu was placed on the laminate (55 mm×55 mm). The chip-laminate module went through a reflow process at 235-250 degrees Celsius. Flux residue, especially at the chip-laminate gap, was removed with deionized water at 40-80 degrees Celsius. All solder bumps joined to laminate capture pads.

Multi-amines in fluxes E, F and I help improve the capability of solder joining and flux-residue cleaning, but they can also tend to diffuse into a solder mask layer of a laminate (substrate) during reflow, and then react with alkyl chloride impurities of the solder mask to form free chloride ions which, in turn, cause corrosion of copper circuitry. Such a problem can be determined by humidity reliability tests such as a highly accelerated temperature and humidity stress test. However, for example, a flux without an organic amine, such as in one or more embodiments of the invention, does not cause such a problem. Fluxes A, B, C, D, G and H do not contain amines. Such a problem does not occur with a solder mask that has a glass transition temperature much higher than the reliability test temperature. In this case, fluxes E, F and I can also be used.

FIG. 1 is a diagram illustrating a substrate, according to an embodiment of the present invention. By way of illustration, FIG. 1 depicts a substrate 12, a pad 14, and a ball grid array (BGA) 16. The substrate can be a laminate containing organic dielectrics, a ceramic substrate made of ceramic dielectrics, a silicon substrate, a glass substrate, a film substrate, a print circuit board (PCB) or a semiconductor device. The pad can be a solder pad or a contact pad. A flux is applied onto the substrate. As described herein, basic requirements of flux can include, by way of example, the following. A flux is preferably tacky enough to hold a chip and a substrate together to overcome vibrations of a reflow-oven belt and emission of vapors. Also, a solder joining should be efficient, producing no non-wets. Further, a flux preferably cleans the chip/substrate/solder joint surfaces with water, with no flux residue left on any of the three surfaces after cleaning.

Figure 2:
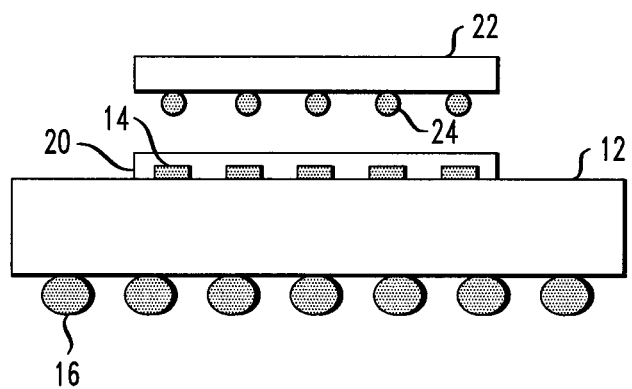
FIG. 2 is a diagram illustrating a flux configuration, according to an embodiment of the present invention.

FIG. 2 is a diagram illustrating a flux configuration, according to an embodiment of the present invention. By way of illustration, FIG. 2 depicts a substrate 12, a pad 14, a ball grid array 16, a flux 20, a semiconductor device (chip) 22 and a solder ball 24. A solder ball 24 can be replaced by a copper pillar capped with solder. When a substrate 12 had a solder pad 14, a solder ball 24 can be replaced by a copper pillar bump or a metal (gold or copper) stud bump. A chip is to be joined onto a substrate to which a flux is applied. A substrate can be, for example, a laminate or a ceramic substrate.

Figure 3A:
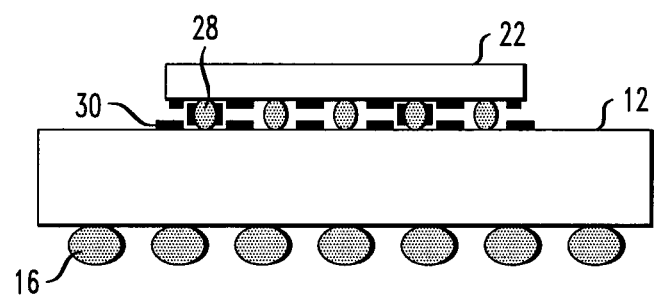
FIGS. 3A and 3B are diagrams illustrating techniques for soldering a semiconductor device to a substrate, according to an embodiment of the present invention.
Figure 3B:
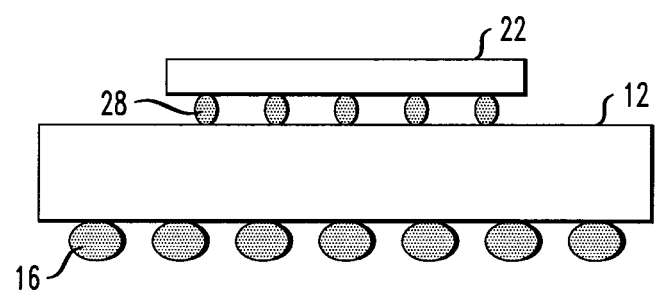

FIGS. 3A and 3B are diagrams illustrating techniques for soldering a chip to a substrate, according to an embodiment of the present invention. By way of illustration, FIG. 3A (and, largely, FIG. 3B as well) depicts a substrate 12, a ball grid array 16, a chip 22, a solder joint (after reflow) 28, and a flux residue 30. Cleaning the flux residue gives FIG. 3B. As such, FIG. 3B depicts a chip-substrate module for which the flux residue is removed typically with water by spraying water at 40-80° C. onto the substrate and into the gap between chip and substrate. Underfill is then applied to the gap to maintain the integrity of the chip-substrate module. The flux residue, if left uncleaned, can cause a failure at the chip-underfill and/or substrate-underfill interface.

Figure 4:
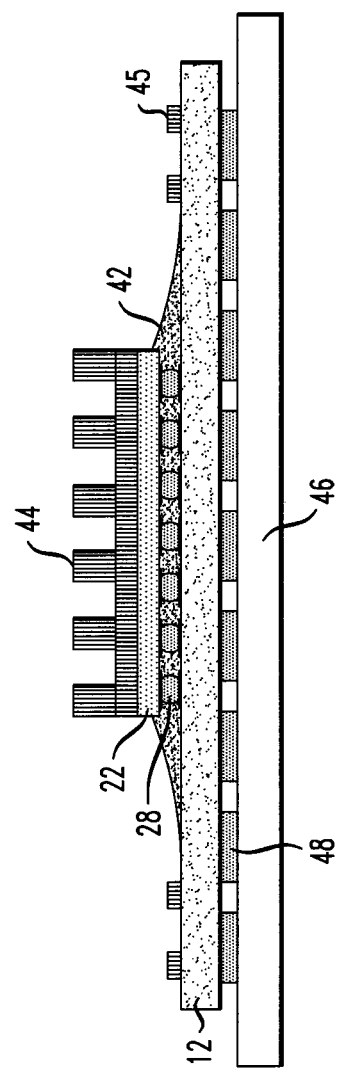
FIG. 4 is a diagram illustrating a flip-chip package configuration, according to an embodiment of the present invention.

FIG. 4 is a diagram illustrating a flip-chip package configuration, according to an embodiment of the present invention. By way of illustration, FIG. 4 depicts a substrate 12, a chip 22, a solder joint 28, a underfill 42, a heat sink (lid) 44, a capacitor 45, a printed wiring board 46, and a BGA joint 48. The underfill not only holds the chip and the substrate together, but also prevents moisture from diffusing to solder joints. The heat sink dissipates heat coming from the chip. BGAs are joined to the large printed wiring board which is also called mother board.

The flux composition of the present invention can be applied, for example, to a chip cage of a substrate, where a chip will be placed, including solder pads 14 (described above in conjunction with the description of FIG. 2). The flux composition may also be applied to contact pads 14 (described above in conjunction with the description of FIG. 2). Additionally, the flux composition can also be applied to a chip 22 including solder balls 24 (described above in conjunction with the description of FIG. 2). The flux composition can also be applied for joining of a capacitor (or resistor) 45 onto a substrate 12 as well as for assembly of a substrate 12 on a printed wiring board 46. Application of the flux composition removes oxide layers out of the solder surfaces and helps achieve chip-substrate solder joining (wetting). The flux composition may be applied to one or more of these structures using conventional application devices, including, but not limited to, a syringe, a brush, a sprayer, a dipper and combinations comprising at least one of the foregoing application devices.

FIG. 2 shows that after the flux composition of the present invention has been applied, where a semiconductor chip 22 is positioned relative to substrate (for example, laminate 12) such that one or more of solder balls 24 contact one or more of the corresponding solder pads 14. As such, a continuous contact is established from solder balls 24 on semiconductor chip 22 to contact pads 14 on substrate 12.

With solder balls 24 and solder pads 14 in contact with each other, the semiconductor chip 22/substrate 12 assembly is heated to melt at least a portion of solder balls 24 and/or solder pads 14. In an example embodiment of the invention, heating is conducted in an oven. During the heating process, the assembly is heated to a temperature of from about 25° C. to about 50° C. above the melting temperature of the solder, to reach a peak reflow temperature. This heating above the melting temperature of the solder helps to ensure that all of the solder reaches a reflow temperature.

For example, a eutectic solder composition, for example, one comprising about 37 percent Pb and about 63 percent Sn, has a melting temperature of about 183° C. and thus the peak reflow temperature would be between about 208° C. to about 233° C. Lead-free solders comprising, for example, about 99.3 percent Sn and about 0.7 percent Cu, have a melting temperature of about 227° C. and those comprising, for example, about 95.5 percent Sn, about 3.8 percent Ag and about 0.7 percent Cu, have a melting temperature of about 217° C. The melting temperature of a certain lead-free solder composition can be approximately 275° C. For these lead-free solders, the peak reflow temperature can be as high as 325° C. The assembly may be kept at the peak reflow temperature for a duration of from about 90 seconds (sec) ±15 sec to about 120 sec±15 sec.

The temperature is then lowered to room temperature. In an example embodiment, the temperature is lowered from the peak reflow temperature at an average rate of about 0.1° C. per sec (as measured from the peak reflow temperature down to 190° C.). As a result of the heating step, solder balls 24 and solder pads 14 undergo melting to make continuous metallurgical and electrical connections between semiconductor chip 22 and substrate 12.

Residues may form on surfaces of the assembly, for example, on the solder-joined regions. These residues can typically include metallic oxides (for example, tin oxides) and organics from flux and organometallic compounds that are formed by the reaction between the solder metals and flux components. Washing may be used to remove these residues. Washing may comprise use of water wash or first the use of an acid wash followed by a water wash.

In one or more embodiments of the invention, the continuous solder connections between semiconductor chip 22 and substrate 12, described above in conjunction with the description of FIG. 3B, may then be encapsulated in, for example, a mixture of an epoxy resin and inorganic fillers, to relieve any strain which may be caused by a difference between the coefficient of thermal expansion (CTE) of substrate 12 and the CTE of semiconductor chip 22. Encapsulating the connections can be accomplished using conventional techniques.

Since Pb may pose health risks, it may be desirable to reduce or eliminate Pb from electrical components. Thus, certain solder compounds may contain, at most, a limited amount of Pb. In one or more embodiments of the invention, a flux composition such as described herein may be used in conjunction with these lead-free solders, especially when the major component of such solder compounds, as is commonly the case, is Sn.

The present flux composition and solder-joining techniques may be employed to mount a pinless chip carrier module, comprising at least one semiconductor chip, for example, an organic module or a ceramic module, to a PCB. Mounting of such a chip carrier module may be accomplished using techniques similar to the mounting techniques described above.

A flux composition and solder-joining techniques of one or more embodiments of the invention may be employed to mount other electronic components, including, but not limited to, resistors and capacitors onto a substrate. Further, while the above techniques have been described in the context of solder-joining electrical components, it is to be understood that the present flux composition and techniques for the use thereof are suitable for any applications that involve flux compositions and the use thereof in solder-joining.

Figure 5A:
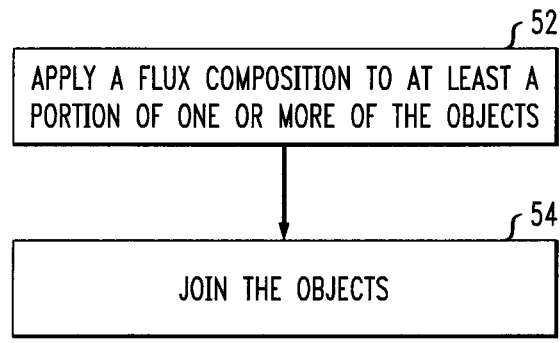
FIGS. 5A and 5B are flow diagrams illustrating techniques for joining objects, according to an embodiment of the present invention.
Figure 5B:
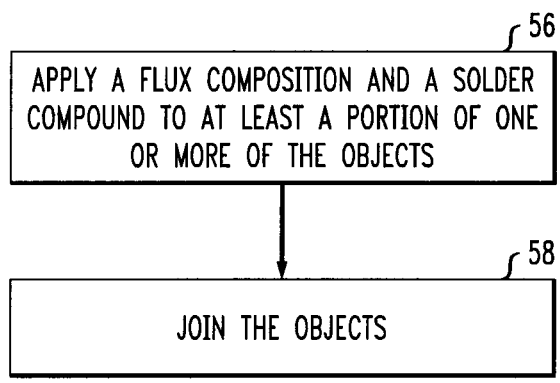

FIGS. 5A and 5B are flow diagrams illustrating techniques for joining objects, according to an embodiment of the present invention. Step 52 includes applying a flux composition to at least a portion of one or more of the objects. Objects can include, for example, a semiconductor device, a chip carrier module, a laminate, a silicon substrate, a glass substrate, a film substrate, a printed circuit board, and/or a ceramic substrate. The flux composition can be applied, for example, to one or more solder regions, to one or more contact pads present on one or more of the objects, etc. Additionally, applying the flux composition can include using an application technique selected from the group including waving, spraying, dipping, brushing, and combinations of the foregoing application techniques. Step 56 includes applying a flux composition and a solder compound to at least a portion of one or more of the objects. Objects can include, for example, a semiconductor device, a chip carrier module, a laminate, a printed circuit board, and/or a ceramic substrate.

In one or more embodiments of the invention, the flux composition (which is water soluble) includes an activator(s), a medium-viscosity solvent being a polymer (for example, a polymer with three hydroxyl end groups), and a high-viscosity solvent being a copolymer containing a plurality of first monomers and a plurality of second monomers. The first monomers and the second monomers can be in a random (or block) sequence to form a random copolymer (or block copolymer). The high-viscosity solvent can also include two hydroxyl end groups. A tackiness measure of the composition, for example, can be a range from 250 gram force to 2,000 gram force.

The medium-viscosity solvent includes at least one of glycerol ethoxylate, glycerol propoxylate, and glycerol ethoxylate-propoxylate copolymer. The medium-viscosity solvent can contain three hydroxyl end groups to facilitate miscibility with water and activators. Also, in one or more embodiments of the invention, the medium-viscosity solvent has a viscosity range of 100 centi-Stokes to 1,000 centi-Stokes.

Further, the high-viscosity solvent includes at least one of ethylene glycol-propylene glycol random copolymer, ethylene glycol-propylene glycol-ethylene glycol block copolymer, and mixtures thereof. The high-viscosity solvent can be a linear polymer to enhance viscosity and tackiness that also contains two hydroxyl end groups to facilitate miscibility with water. Also, in one or more embodiments of the invention, the high-viscosity solvent can have a molecular weight in a range of 1,500 to 12,000, and a viscosity range of 400 centi-Stokes to 35,000 centi-Stokes. Also, in one or more embodiments of the invention, the high-viscosity solvent can include, for example, selected commercially available solvents including DOW Chemical's Polyox™, cellulose polymers, and UCON™ fluids.

The activator can include, for example, a diacid in a liquid state, as well as multi-acids that contain two or more carboxylic acid groups. The activator can also include, for example, keto acid, which can be selected from levulinic acid, acetyl butyric acid, 2-acetylbenzoic acid, 2-acetyloxybenzoic acid, 2-ketobutyric acid, acetoxyacetic acid, and pyruvic acid or mixtures thereof. Further, in one or more embodiments of the invention, the activator is soluble in both the solvents and water, and it has a boiling point of greater than 250 degrees Celsius. The solvents can each also have a boiling point of greater than 250 degrees Celsius.

Additionally, in one or more embodiments of the invention, the flux composition can include one or more highly tacky multi-acids. The tacky activator can be a liquid that has a viscosity range of 200 centi-Stokes to 10,000 centi-Stokes, and a boiling point of greater than 250 degrees Celsius.

Also, in one or more embodiments of the invention, the flux composition can include one or more multi-amines such as tetrakis(4-hydroxypropyl)ethylenediamine (Quadrol®) and tetrakis(4-hydroxyethyl)ethylenediamine.

Further, in one or more embodiments of the invention, the composition includes from about five percent by weight to about twenty percent by weight of the activator, from about fifteen percent by weight to about seventy-five percent by weight of the medium viscosity solvent, and from about twenty percent by weight to about eighty percent by weight of the high viscosity solvent, based on total weight of the composition. One or more embodiments of the invention can also include from about four percent by weight to about ten percent by weight of multi-amines, based on total weight of the composition.

Steps 54 and 58 include joining the objects. Joining the objects can include introducing the objects to heat (for example, heat that includes a range from about 220° C. to about 325° C.). The techniques depicted in FIGS. 5A and 5B can additionally include removing flux residue formed during joining. Removing flux residue can include, for example, using water to remove flux residue.

One or more embodiments of the invention can also include a flux composition that includes an activator, and a high-viscosity solvent, wherein the high-viscosity solvent comprises a copolymer containing a plurality of first monomers and a plurality of second monomers.

Additionally, one or more embodiments of the invention include a flux composition that includes one or more activators from the selected diacids (for example, an activator of 6-12 percent by weight of glutaric acid, pimelic acid, tartaric acid, or mixtures thereof, based on total weight of the composition), and a medium-viscosity solvent (for example, of 88-94 percent by weight of based on total weight of the composition), wherein the medium-viscosity solvent comprises a polymer with hydroxyl end groups. The medium-viscosity solvent can include, for example, at least one of glycerol ethoxylate, glycerol propoxylate, a glycerol ethoxylate-propoxylate copolymer and mixtures thereof. By way of example, such a flux composition can include an activator of glutaric acid and a medium-viscosity solvent of glycerol ethoxylate. Additionally, such a flux composition can also include from about four percent by weight to about ten percent by weight of multi-amines, based on total weight of the composition.

Further, one or more embodiments of the invention include a flux composition that includes an activator in a liquid state (for example, a diacid or multiacid such as poly(ethylene glycol)-diacid), and a medium-viscosity solvent, wherein the medium-viscosity solvent comprises a polymer with hydroxyl end groups. The medium-viscosity solvent can include, for example, at least one of glycerol ethoxylate, glycerol propoxylate, a glycerol ethoxylate-propoxylate copolymer and mixtures thereof. Also, such a flux composition can include from about four percent by weight to about ten percent by weight of multi-amines, based on total weight of the composition.

At least one embodiment of the invention may provide one or more beneficial effects, such as, for example, a flux composition, the property of which includes flip-chip solder joining capability, high tackiness, water cleaning capability, and no boiling at reflow. Additionally, at least one embodiment of the invention also provides beneficial effects such as, for example, providing a flux with increased tackiness while the flux maintains other standard flux properties (for example, water solubility).

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A soldering method for joining objects, comprising the steps of:
    generating a flux composition by:
        combining, at approximately sixty degrees Celsius for at least approximately one hour, (i) about five percent by weight to about twenty percent by weight of an activator consisting of a mixture of 2-acetyloxybenzoic acid, acetyl butyric acid, levulinic acid, 2-acetylbenzoic acid, 2-ketobutyric acid, acetoxyacetic acid, and pyruvic acid, (ii) about fifteen percent by weight to about seventy-five percent by weight of a medium-viscosity solvent being a polymer in a liquid state, wherein the medium-viscosity solvent consists of a mixture of glycerol ethoxylate, glycerol propoxylate, and a glycerol ethoxylate-propoxylate copolymer, (iii) about twenty percent by weight to about eighty percent by weight of a high-viscosity solvent with hydroxyl end groups, wherein said high-viscosity solvent comprises a random copolymer containing a plurality of first monomers and a plurality of second monomers combined in a random sequence to form the random copolymer, and wherein said high-viscosity solvent is in a liquid state at room temperature, and (iv) about four percent by weight to about ten percent by weight of multi-amines, wherein the multi-amines comprises tetrakis(4-hydroxyethyl)ethylenediamine;

applying the flux composition to at least a portion of one or more of the objects; and joining the objects.

2. The method of claim 1, further comprising applying a solder compound with the flux composition to at least a portion of one or more of the objects.

3. The method of claim 1, wherein joining the objects comprises introducing the objects to heat, wherein the heat comprises a range from about 220° C. to about 325° C.

4. The method of claim 1, further comprising removing flux residue formed during joining, wherein removing flux residue formed during joining comprises using water to remove flux residue.

5. A soldering method for joining objects, comprising the steps of:

generating a flux composition by:

combining, at approximately sixty degrees Celsius for at least approximately one hour, (i) about six percent by weight to about twelve percent by weight of an activator in a liquid state at room temperature that is soluble in both the solvents and water, wherein the activator consists of a mixture of 2-acetyloxybenzoic acid, acetyl butyric acid, levulinic acid, 2-acetylbenzoic acid, 2-ketobutyric acid, acetoxyacetic acid, and pyruvic acid, (ii) about eighty-eight percent by weight to about ninety-four percent by weight of a medium-viscosity solvent, wherein the medium-viscosity solvent consists of a mixture of glycerol ethoxylate, glycerol propoxylate, and a glycerol ethoxylate-propoxylate copolymer, and (iii) about four percent by weight to about ten percent by weight of multi-amines, wherein the multi-amines comprises tetrakis(4-hydroxyethyl)ethylenediamine;

applying the flux composition to at least a portion of one or more of the objects; and joining the objects.

6. The method of claim 5, further comprising applying a solder compound with the flux composition to at least a portion of one or more of the objects.

7. The method of claim 5, wherein joining the objects comprises introducing the objects to heat, wherein the heat comprises a range from about 220° C. to about 325° C.

8. The method of claim 5, further comprising removing flux residue formed during joining, wherein removing flux residue formed during joining comprises using water to remove flux residue.

* * * * *

UNITED STATES PATENT AND TRADEMARK OFFICE
CERTIFICATE OF CORRECTION

PATENT NO. : 9,808,874 B2
APPLICATION NO. : 13/613000
DATED : November 7, 2017
INVENTOR(S) : Kang-Wook Lee et al.

It is certified that error appears in the above-identified patent and that said Letters Patent is hereby corrected as shown below:

On the Title Page

In Line 2 of the ABSTRACT, please remove the words "is also provided."

Signed and Sealed this
Nineteenth Day of December, 2017

Joseph Matal
*Performing the Functions and Duties of the*
*Under Secretary of Commerce for Intellectual Property and*
*Director of the United States Patent and Trademark Office*